(12) United States Patent
Watanabe

(10) Patent No.: US 7,724,448 B2
(45) Date of Patent: May 25, 2010

(54) ZOOM LENS AND IMAGE PICKUP APPARATUS EQUIPPED WITH SAME

(75) Inventor: Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/315,866

(22) Filed: Dec. 4, 2008

(65) Prior Publication Data

US 2009/0168195 A1 Jul. 2, 2009

(30) Foreign Application Priority Data

Dec. 7, 2007 (JP) .............................. 2007-317005

(51) Int. Cl.
G02B 15/14 (2006.01)

(52) U.S. Cl. ...................... 359/686; 359/687

(58) Field of Classification Search ................. 359/687, 359/686, 676; 348/240.99–240.3, 335–369; 396/72–88
See application file for complete search history.

(56) References Cited

U.S. PATENT DOCUMENTS

| | | | |
|---|---|---|---|
| 5,731,897 A * | 3/1998 | Suzuki ........................ | 359/557 |
| 6,646,803 B2 * | 11/2003 | Hayakawa et al. .......... | 359/557 |
| 7,151,638 B2 | 12/2006 | Ohashi | |
| 2005/0190457 A1 | 9/2005 | Ohashi | |
| 2005/0195493 A1 * | 9/2005 | Nishina et al. ............... | 359/687 |
| 2006/0098301 A1 | 5/2006 | Miyajima | |
| 2006/0262422 A1 * | 11/2006 | Ohashi ........................ | 359/687 |

FOREIGN PATENT DOCUMENTS

| | | |
|---|---|---|
| JP | 2005-242116 | 8/2005 |
| JP | 2005-326743 | 11/2005 |

(Continued)

OTHER PUBLICATIONS

U.S. patent No. 7,151,638 granted on Dec. 19, 2006 and U.S. Patent Laid-Open Publication No. 2005/0190457 laid-open on Sep. 1, 2005 corresponding to the following (2) and (3).

(Continued)

Primary Examiner—Darryl J Collins
(74) Attorney, Agent, or Firm—Kenyon & Kenyon LLP

(57) ABSTRACT

A zoom lens has, in order from the object side thereof, a positive first lens unit G1, a negative second lens unit G2, a positive third lens unit G3, a fourth lens unit G4, and an aperture stop S disposed closer to the image side than the second lens unit and closer to the object side than the lens surface closest to the image side in the third lens unit, wherein during zooming from the wide angle end to the telephoto end, the distance between the first lens unit G1 and the second lens unit G2 is larger at the telephoto end than at the wide angle end, the distance between the second lens unit G2 and the third lens unit G3 is smaller at the telephoto end than at the wide angle end, the distance between the third lens unit G3 and the fourth lens unit G4 changes, and the first lens unit G1, the third lens unit G3 and the aperture stop S move in such a way that they are located closer to the object side at the telephoto end than at the wide angle end. The zoom lens satisfies prescribed conditional expressions.

18 Claims, 12 Drawing Sheets

FOREIGN PATENT DOCUMENTS

| | | |
|---|---|---|
| JP | 2006-078979 | 3/2006 |
| JP | 2006-133631 | 5/2006 |
| JP | 2006-171055 | 6/2006 |

OTHER PUBLICATIONS

Japanese Patent Laid-Open Publication No. 2005-242116 laid-open on Sep. 8, 2005 with English abstract.

Japanese Patent Laid-Open Publication No. 2005-326743 laid-open on Nov. 24, 2005 with English abstract.

Japanese Patent Laid-Open Publication No. 2006-078979 laid-open on Mar. 23, 2006 with English translation thereof.

U.S. Patent Laid-Open Publication No. 2006/0098301 laid-open on May 11, 2006 corresponding to the following (6) and (7).

Japanese Patent Laid-Open Publication No. 2006-133631 laid-open on May 25, 2006 with English abstract.

Japanese Patent Laid-Open Publication No. 2006-171055 laid-open on Jun. 29, 2006 with English abstract.

* cited by examiner

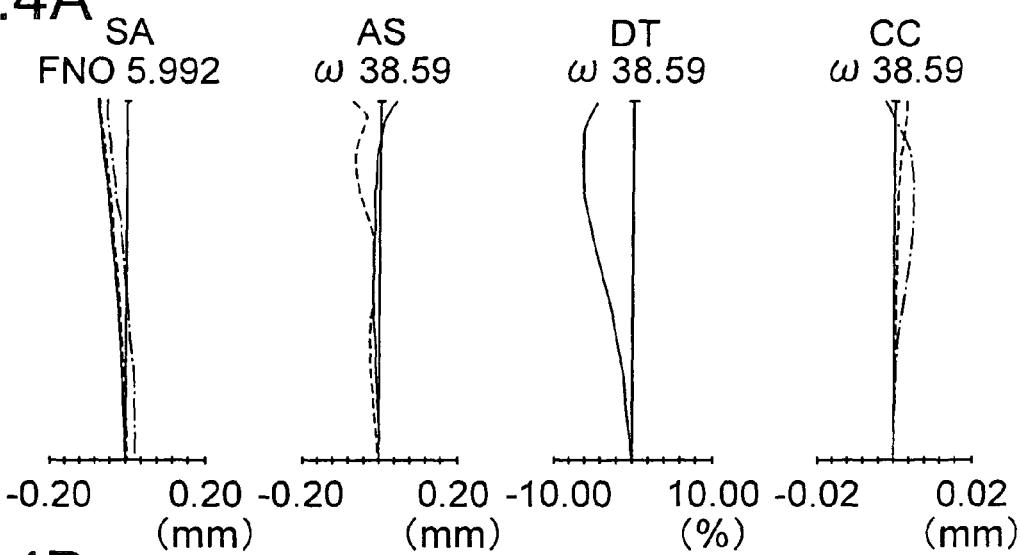
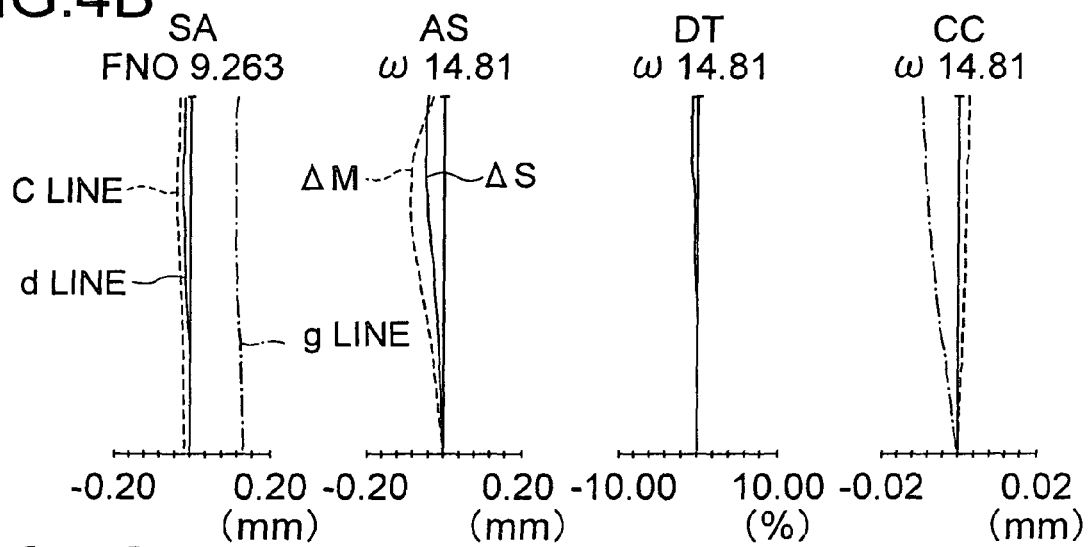
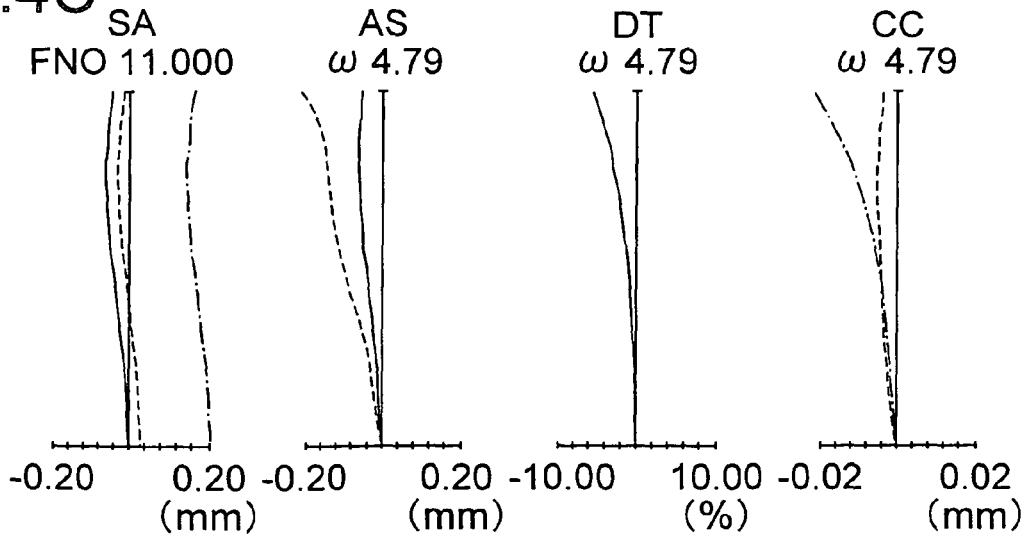

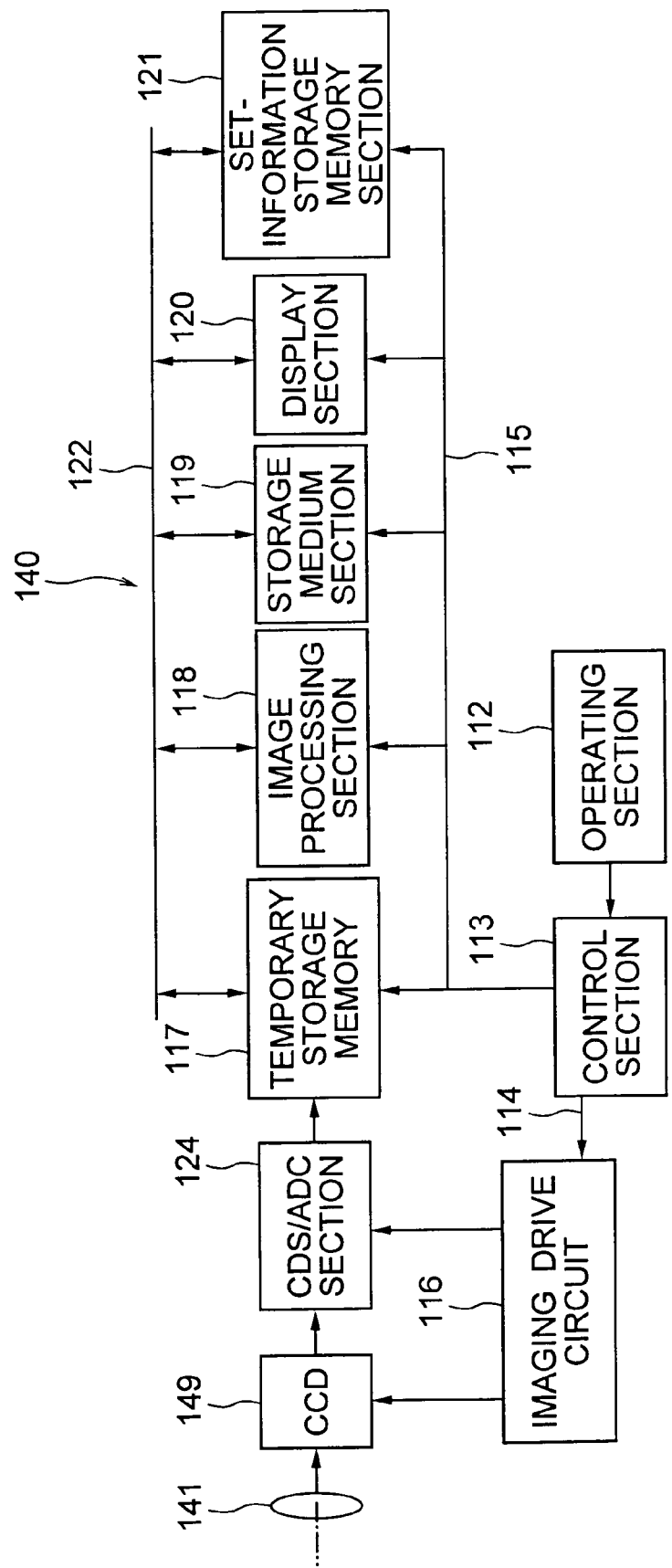

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2007-317005 filed on Dec. 7, 2007; the entire contents of which are incorporated herein by reference.

BACKGROUND OF THE INVENTION

1. Field of the Invention

The present invention relates to a zoom lens and an image pickup apparatus equipped with the same.

2. Description of the Related Art

In recent years, digital cameras that pick up an image of an object using an image pickup element such as a CCD or CMOS sensor have replaced film cameras to become the mainstream.

Among such digital cameras, cameras of a type that is small in size with respect to the thickness direction (i.e. direction along the optical axis) to facilitate portability have been favored.

On the other hand, although zoom ratios of zoom lenses used in compact digital cameras are typically about three, zoom lenses having higher zoom ratios are demanded recently.

There is a known type of zoom lens that can easily achieve a high zoom ratio, that is, a zoom lens having three or more lens units including, in order from the object side thereof, a first lens unit having a positive refracting power, a second lens unit having a negative refracting power and a rear group having a positive refracting power, the lens unit located closest to the object side in the rear group being a third lens unit having a positive refracting power.

For example, Japanese Patent Application Laid-Open Nos. 2005-242116, 2005-326743 and 2006-78979 disclose zoom lenses having a zoom ratio of about 4.5. Furthermore, Japanese Patent Application Laid-Open Nos. 2006-171055 and 2006-133631 disclose zoom lenses having a higher zoom ratio of about 10.

SUMMARY OF THE INVENTION

A zoom lens according to one aspect of the present invention comprises, in order from the object side thereof:

a first lens unit having a positive refracting power;
a second lens unit having a negative refracting power:
a third lens unit having a positive refracting power; and
a fourth lens unit having a refracting power, wherein the zoom lens further comprises an aperture stop disposed closer to the image side than the second lens unit and closer to the object side than the lens surface closest to the image side in the third lens unit, during zooming from the wide angle end to the telephoto end in the state in which the zoom lens is focused at the farthest distance, the distance between the first lens unit and the second lens unit is larger at the telephoto end than at the wide angle end, the distance between the second lens unit and the third lens unit is smaller at the telephoto end than at the wide angle end, the distance between the third lens unit and the fourth lens unit changes, the first lens unit, the third lens unit and the aperture stop move in such a way that they are located closer to the object side at the telephoto end than at the wide angle end, when a lens component is defined as a lens member whose surfaces that are in contact with air on an optical axis include only two surfaces, one being an incidence side surface and the other being an exit side surface, the first lens unit comprises one lens component, and the total number of lens components included in the first lens unit is one, the third lens unit comprises a positive lens and a negative lens, and the zoom lens satisfies the following conditions:

$$0.8 < \Delta G_1 / \Delta G_3 < 1.6$$

$$0.15 < \phi 3 / \phi 4 < 0.3$$

$$8.0 < f_t/f_w < 25.0$$

where, $\Delta G_1$ is the amount of displacement, on the optical axis, of the position of the first lens unit at the telephoto end with respect to the position thereof at the wide angle end, wherein displacements toward the object side at the telephoto end are represented by positive values, $\Delta G_3$ is the amount of displacement, on the optical axis, of the position of the third lens unit at the telephoto end with respect to the position thereof at the wide angle end, wherein displacements toward the object side at the telephoto end are represented by positive values, $\phi 3$ is the lens size in the third lens unit represented by the maximum value of the length from one edge to another of the lens measured along a straight line containing a point through which the optical axis passes and perpendicular to the optical axis, $\phi 4$ is the lens size in the fourth lens unit represented by the maximum value of the length from one edge to another of the lens measured along a straight line containing a point through which the optical axis passes and perpendicular to the optical axis, $f_w$ is the focal length of the entire zoom lens system at the wide angle end, and $f_t$ is the focal length of the entire zoom lens system at the telephoto end.

An image pickup apparatus according to another aspect of the present invention comprises a zoom lens as described above, and an image pickup element disposed on the image side of the zoom lens that converts an image formed by the zoom lens into an electrical signal.

BRIEF DESCRIPTION OF THE DRAWINGS

FIGS. 4A, 4B and 4C are aberration diagrams of the zoom lens according to the first embodiment in the state in which the zoom lens is focused on an object point at infinity;

FIG. 12 is a block diagram of an internal circuit of a principal portion of the digital camera.

DETAILED DESCRIPTION OF THE INVENTION

Figure 1A:
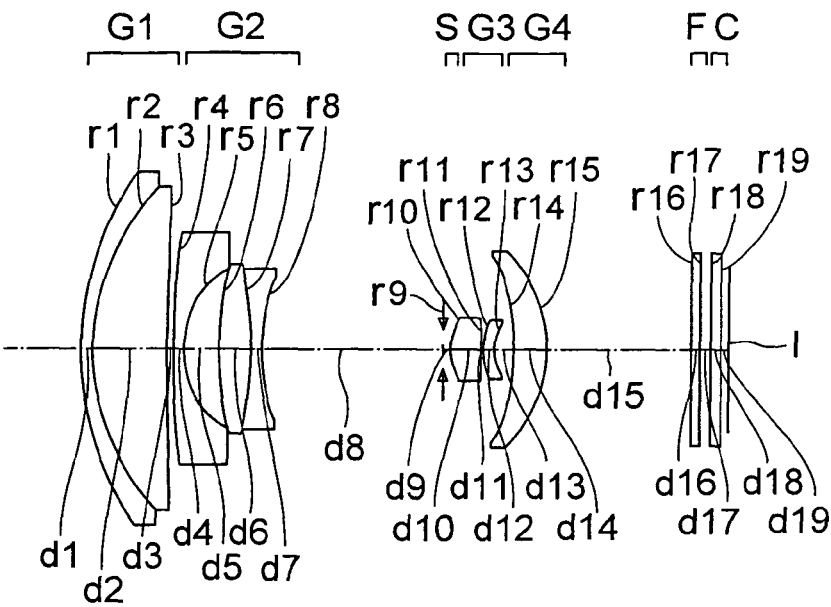
FIGS. 1A to 1C are cross sectional views of a zoom lens according to a first embodiment of the present invention in the state in which the zoom lens is focused on a object point at infinity respectively at the wide angle end (FIG. 1A), in an intermediate zoom state (FIG. 1B) ant at the telephoto end (FIG. 1C)

The zoom lens according to the present invention includes, in order from the object side thereof:

a first lens unit having a positive refracting power;
a second lens unit having a negative refracting power;
a third lens unit having a positive refracting power;
a fourth lens unit having a refracting power; and
an aperture stop disposed closer to the image side than the second lens unit and closer to the object side than the lens surface closest to the image side in the third lens unit, wherein during zooming from the wide angle end to the telephoto end in the state in which the zoom lens is focused at the farthest distance, the distance between the first lens unit and the second lens unit is larger at the telephoto end than at the wide angle end, the distance between the second lens unit and the third lens unit is smaller at the telephoto end than at the wide angle end, the distance between the third lens unit and the fourth lens unit changes, and the first lens unit, the third lens unit and the aperture stop move in such a way that they are located closer to the object side at the telephoto end than at the wide angle end, when a lens component is defined as a lens member whose surfaces that are in contact with air on an optical axis include only two surfaces, one being an incidence side surface and the other being an exit side surface, the first lens unit is composed of one lens component, the third lens unit has two lenses including a positive lens and a negative lens, and the zoom lens satisfies the following conditions:

$$0.8 < \Delta G_1 / \Delta G_3 < 1.6 \quad (1)$$

$$0.15 < \phi 3 / \phi 4 < 0.35 \quad (2)$$

$$8.0 < f_t / f_w < 25.0 \quad (3)$$

where, $\Delta G_1$ is the amount of displacement, on the optical axis, of the position of the first lens unit at the telephoto end with respect to the position thereof at the wide angle end, wherein displacements toward the object side at the telephoto end are represented by positive values, $\Delta G_3$ is the amount of displacement, on the optical axis, of the position of the third lens unit at the telephoto end with respect to the position thereof at the wide angle end, wherein displacements toward the object side at the telephoto end are represented by positive values, $\phi 3$ is the lens size in the third lens unit represented by the maximum value of the length from one edge to another of the lens measured along a straight line containing a point through which the optical axis passes and perpendicular to the optical axis, $\phi 4$ is the lens size in the fourth lens unit represented by the maximum value of the length from one edge to another of the lens measured along a straight line containing a point through which the optical axis passes and perpendicular to the optical axis, $f_w$ is the focal length of the entire zoom lens system at the wide angle end, and $f_t$ is the focal length of the entire zoom lens system at the telephoto end.

Locating the first lens unit closer to the object side at the telephoto end than at the wide angle end is advantageous in providing an adequate magnification change by a change in the distance between the first lens unit and the second lens unit.

By locating the third lens unit closer to the object side at the telephoto end than at the wide angle end, the third lens unit also provides a magnification change, which is advantageous in increasing the zoom ratio.

In this scheme of magnification change, the aperture stop is also moved toward the object side as with the third lens unit, whereby the position of the exit pupil is shifted away from the image plane during zooming from the wide angle end. In addition it becomes easy to provide an adequately large zoom range in which good telecentricity of the zoom lens is achieved. The aperture stop is located in the vicinity of the third lens unit, and the aperture stop is designed to have a locus of movement similar to or the same as that of the third lens unit. This also facilitates reduction in the size of the third lens unit and reduction in the entire length of the zoom lens at the wide angle end.

To achieve a further size reduction, the first lens is composed of one positive lens component. In the first lens unit, the height of the incident rays is high in a zoom range near the wide angle end. An increase in the number of lens component in this lens unit, in particular, leads to an increase in the size with respect to both the thickness direction (i.e. the direction along the optical axis) and the diametrical direction. In view of this, it is preferred that the first lens unit be composed of one lens component.

The third lens unit tends to be designed to have a high refracting power in order to provide an adequate magnification change. Having a positive lens and a negative lens in the third lens unit facilitates cancellation of aberrations generated in the respective lenses. Thus, influences of aberrations can be readily reduced.

Conditional expression (1) restricts the range of values for the ratio of the movement amounts of the first lens unit and the third lens unit.

By designing the zoom lens in such a way that the lower limit of conditional expression (1) is not exceeded, the movement amount of the third lens unit is prevented from becoming unduly large. This facilitates reduction of variations in aberrations during zooming. On the other hand, by making the amount of movement of the first lens unit toward the object side large, the first lens unit and the second lens unit are prevented from largely extending toward the object side at the wide angle end. This facilitates reduction of the effective diameter and is advantageous in reducing the diameter of the zoom lens.

By designing the zoom lens in such a way that the upper limit of conditional expression (1) is not exceeded, the movement amount of the first lens unit is prevented from becoming unduly large. This is advantageous in reducing the entire length of the zoom lens in the zoom range near the telephoto end. This is also advantages in reducing the thickness of the lens barrel for driving the zoom lens and the number of stages of collapse. Thus, the size of the zoom lens in the state in which the lens barrel is collapsed can be advantageously made small.

Conditional expression (2) restricts the range of values for the ratio of the size of the third lens unit and the size of the fourth lens unit.

It is preferred that the zoom lens be designed in such a way that the lower limit of conditional expression (2) is not exceeded so that the third lens unit has a size large enough to provide an adequate quantity of light, or that the size of the fourth lens unit is prevented from becoming large.

By designing the zoom lens in such a way that the upper limit of conditional expression (2) is not exceeded, the ray height of marginal rays can be made small. This is advantageous in reducing spherical aberration and coma. Furthermore, by making the size of the third lens unit smaller with respect to the diametrical direction, its size with respect to the thickness direction can also easily be made small. This is advantageous in reducing the size of the zoom lens in the state in which the lens barrel is collapsed.

Conditional expression (3) restricts the range of values for the zoom ratio of the zoom lens.

It is preferred to design the zoom lens in such a way that the lower limit of conditional expression (3) is not exceeded to thereby achieve an adequate zoom ratio so that the zoom lens can be used suitably in various shooting situations.

By designing the zoom lens in such a way that the upper limit of conditional expression (3) is not exceeded, the number of lenses is not required to be made large in order to reduce aberrations necessitated by increased refracting powers of the respective lens units. This is advantageous in reducing the size of the zoom lens in the state in which the lens barrel is collapsed.

It is more preferred that at least one of the following features be adopted in addition to the above described basic features.

It is preferred that the lens component included in the first lens unit be a cemented lens composed of a biconvex positive lens and a negative lens. This is advantageous in reducing on-axis chromatic aberration of the first lens unit that tends to be conspicuous in a zoom range near the telephoto end. Using a cemented lens makes it easier to reduce decentering aberrations generated due to decentering of lenses relative to each other than using a positive lens and a negative lens that are disposed separately.

It is also preferred that the lens component in the first lens unit be a positive lens element having a biconvex shape. By this feature, the positive refracting power of the first lens unit is shared by a plurality of surfaces. This is advantageous in reducing aspherical aberration of the first lens unit that tends to be conspicuous in a zoom range near the telephoto end.

It is also preferred that the second lens unit have a plurality of negative lenses and at least one positive lens.

By this feature, the negative refracting power of the second lens unit that provides a large amount of magnification change can be shared by the plurality of negative lenses, and aberrations can be cancelled by the aforementioned at least one positive lens. Thus, this feature is advantageous in reducing spherical aberration, chromatic aberration and off-axis aberration of the second lens unit.

It is also preferred that the second lens unit be composed of two lens components, one being an object side lens component having a concave surface directed toward the image side and having a negative refracting power and the other being an image side lens component having a concave surface directed toward the image side, which are arranged in the mentioned order from the object side, namely the total number of lens components included in the second lens unit be two, and the image side lens component include a positive lens and a negative lens.

This makes it easy to locate a principal point of the second lens unit at a position closer to the object side. This is advantageous in making the size of the second lens unit smaller. This is also advantageous in correcting off-axis aberrations, chromatic aberration and spherical aberration in a zoom range near the wide angle end. In addition, since the positive lens and the negative lens are cemented together, it becomes easy to reduce generation of decentering aberrations due to decentering of the lenses with each other.

It is also preferred that the third lens unit be composed of two lens component, one being a positive lens component having a positive refracting power and the other being a negative lens component having a negative refracting power, which are arranged in the mentioned order from the object side, namely the total number of lens components included in the third lens unit be two. This feature is advantageous in correcting chromatic aberration, in reducing the size and in achieving a higher zoom ratio.

It is also preferred that the third lens unit be composed of two lens components, one being a biconvex positive lens component having a convex surface directed toward the object side and the other being a meniscus negative lens component having a convex surface directed toward the object side, which are arranged in the mentioned order from the object side, namely the total number of lens components in the third lens unit be two.

This makes it easy to locate a principal point of the third lens unit at a position closer to the object side. This is advantageous in providing an adequate magnification change relative to the amount of movement of the third lens unit. By having three lens surfaces having positive refracting powers in the third lens unit, the effective diameter of the third lens unit can be made small. In addition, this feature is advantageous in reducing spherical aberration.

It is also preferred that the lens located closest to the object side in the third lens unit be a biconvex positive lens having an object side surface that has an paraxial curvature larger than the paraxial curvature of its image side surface, and this lens satisfy the following condition:

$$75 < v_{31} < 96 \tag{4}$$

where $v_{31}$ is the Abbe number of the biconvex positive lens located closest to the object side in the third lens unit.

Using a biconvex positive lens having an object side surface that has a high refracting power as the lens located closest to the object side in the third lens unit facilitates correction of spherical aberration and coma.

Conditional expression (4) specifies preferred values of the Abbe number of the biconvex positive lens located closest to the object side in the third lens unit.

Designing this lens in such a way that the lower limit of conditional expression (4) is not exceeded facilitates reduction of chromatic aberration in the third lens unit.

Designing this lens in such a way that the upper limit of conditional expression (4) is not exceeded facilitates reduction of anomalous dispersion and reduction of secondary spectrum.

It is also preferred that the fourth lens unit be composed of one lens having an aspheric surface, namely the total number of lenses included in the fourth lens unit be one, and this lens have a convex image side surface having a paraxial curvature that is larger in the absolute value than the paraxial curvature of its object side surface. This is advantageous in correcting curvature of field.

Furthermore, it is preferred that the fourth lens unit be composed of a meniscus lens having a positive refracting power. This facilitates reduction of variations in the angle of incidence of rays on the image pickup element throughout the zoom range from the wide angle end to the telephoto end.

It is also preferred that the following condition be satisfied:

$$0.6 < TL_t/f_t < 0.9 \tag{5}$$

where $TL_t$ is the actual distance on the optical axis from the object side surface of the first lens unit to the image plane at the telephoto end, and $f_t$ is the focal length of the entire zoom lens system at the telephoto end.

Conditional expression (5) specifies preferred values for the actual distance on the optical axis from the object side surface of the first lens unit to the image plane at the telephoto end.

By designing the zoom lens in such a way that the lower limit of conditional expression (5) is not exceeded, the refracting power of the second lens unit can be readily made small. This is advantageous in reducing aberrations. On the other hand, the entire length of the zoom lens at the wide angle end and the size of the first and the second lens units with respect to the diametrical direction can easily be made small while achieving an adequate zoom ratio.

Designing the zoom lens in such a way that the upper limit of the conditional expression (5) is not exceeded is advantageous in making the size of the zoom lens in the zoom range near the telephoto end.

It is also preferred that during zooming from the wide angle end to the telephoto end, the aperture stop move integrally with the third lens unit. This facilitates reduction of the effective diameter of the third lens unit. In addition, this is advantageous in reducing the cost, since the drive mechanism can be made simple.

It is also preferred that the third lens unit satisfy the following condition:

$$0.03 < D_{3G}/TL_t < 0.07 \quad (6)$$

where $D_{3G}$ is the thickness of the third lens unit on the optical axis, and $TL_t$ is the actual distance on the optical axis from the object side surface of the first lens unit to the image plane at the telephoto end.

According to the present invention, the diameter of the third lens can be made small. Therefore, even when the thickness of the third lens unit on the optical axis is made intentionally small, the third lens unit can easily be designed to have an adequate refracting power.

Conditional expression (6) specifies preferred values for the thickness of the third lens unit on the optical axis.

By designing the third lens unit in such a way that the lower limit of conditional expression (6) is not exceeded, the thickness of the third lens unit is prevented from becoming unduly small. It is preferred that by this design, the third lens unit achieve reduction of off-axis aberrations and have an adequate refracting power.

Designing the third lens unit in such a way that the upper limit of conditional expression (6) is not exceeded is advantageous in making the size of the third lens unit small and in providing a space for movement of the third lens unit during zooming.

It is also preferred that the third lens unit satisfy the following condition:

$$0.13 < f_{3G}/f_t < 0.22 \quad (7)$$

where $f_{3G}$ is the focal length of the third lens unit, and $f_t$ is the focal length of the entire zoom lens system at the telephoto end.

Conditional expression (7) specifies preferred refracting powers for the third lens unit.

The refracting power of the third lens unit is restricted appropriately so that the lower limit of conditional expression (7) is not exceeded. This facilitates reduction of spherical aberration and coma in the third lens unit.

By designing the third lens unit in such a way that the upper limit of conditional expression (7) is not exceeded, the third lens unit has an adequate refracting power, which is advantageous in providing an adequate magnification change by the third lens unit.

An image pickup apparatus according to the present invention comprises at least any one of the above described zoom lenses and an image pickup element disposed on the image side of the zoom lens that converts an image formed by the zoom lens into an electrical signal. Thus, an image pickup apparatus equipped with a zoom lens that is small in size in the state in which the lens barrel is collapsed and can readily have a high zoom ratio can be provided.

Furthermore, it is preferred that the image pickup apparatus be provided with an image processing section that performs signal processing for correcting aberrations contained in the image represented by the electrical signal. This is advantageous in further reducing the size of the zoom lens and in reducing the cost, since aberrations of the zoom lens are allowed to be left.

In the case where the zoom lens has a focusing function, the conditional expressions presented above should be regarded as conditions in the state in which the zoom lens is focused on an object at the farthest distance.

Focusing operation from an object at a long distance to an object at a short distance may be performed by advancing the first lens unit, advancing the entire zoom lens or moving the second and/or third lens unit. To reduce the load on driving for focusing, it is preferred that the focusing be performed by moving the fourth lens unit having a positive refracting or negative refracting power.

It is also preferred that two or more of the above described features be adopted at the same time.

It is more preferred that limit values in the above-mentioned conditional expressions be as follows.

As to conditional expression (1), it is more preferred that the lower limit value be 1.0. It is more preferred that the upper limit value be 1.4.

As to conditional expression (2), it is more preferred that the lower limit value be 0.2. It is more preferred that the upper limit value be 0.3.

As to conditional expression (3), it is more preferred that the lower limit value be 9.0. It is more preferred that the upper limit value be 22.0.

As to conditional expression (4), it is more preferred that the lower limit value be 80. It is more preferred that the upper limit value be 85.

As to conditional expression (5), it is more preferred that the lower limit value be 0.65. It is more preferred that the upper limit value be 0.87.

As to conditional expression (6), it is more preferred that the lower limit value be 0.035. It is more preferred that the upper limit value be 0.065.

As to conditional expression (7), it is more preferred that the lower limit value be 0.14. It is more preferred that the upper limit value be 0.2.

In the above-described modes of the invention, it is more preferred that some of the conditions, which may be selected arbitrarily, be satisfied at the same time. In the more preferred numerical range limitations by each of the conditional expressions presented just above, limitation by only the upper limit value or the lower limit value may be applied. Furthermore, the various features described above may be adopted in any possible combination.

In the following, embodiments of the zoom lens and the image pickup apparatus according to the present invention will be described in detail with reference to the drawings. It should be understood, however, that the present invention is not limited by the embodiments. The zoom lens according to each embodiment has an adequately large angle of field at the wide angle end and has a third lens unit that is small in size while having a high zoom ratio, and thus the zoom lens is advantageous in reduction of the size in the state in which the lens barrel is collapsed.

In the following, first to third embodiments of the zoom lens according to the present invention will be described. FIGS. 1A to 1C, 2A to 2C and 3A to 3C are cross sectional views of the zoom lenses according to the first to the third embodiments respectively at the wide angle end (FIGS. 1A, 2A and 3A), in an intermediate focal length state (FIGS. 1B, 2B and 3B) and at the telephoto end (FIGS. 1C, 2C and 3C) in the state in which the zoom lenses are focused on an object point at infinity. In FIGS. 1A to 1C, 2A to 2C and 3A to 3C, a first lens unit is denoted by G1, a second lens unit is denoted by G2, an aperture stop is denoted by S, a third lens unit is denoted by G3, a fourth lens unit is denoted by G4, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

In each embodiment, the aperture stop S moves integrally with the third lens unit G3. All the numerical data presented below are for the state in which the zoom lens is focused on an object at infinity. In the numerical data, dimensions are in mm (millimeters) and angles are in degrees. In all the embodiments, focusing is performed by moving the lens unit located closest to the image side. Zoom data will be presented for the wide angle end (WE), the intermediate focal length state (ST) and the telephoto end (TE).

In the zoom lenses according to the first to the third embodiments described below, the effective image pickup area has a constant rectangular shape at all the zoom positions. As described above, all the numerical values associated with conditional expressions presented below for each embodiment are for the state in which the zoom lens is focused on an object point at infinity.

Focusing operation from an object at a long distance to an object at a short distance is performed by moving the fourth lens unit toward the object side. As described above, the plane parallel plates including a low pass filter having IR cut coating applied thereon and a CCD cover glass.

Figure 1B:
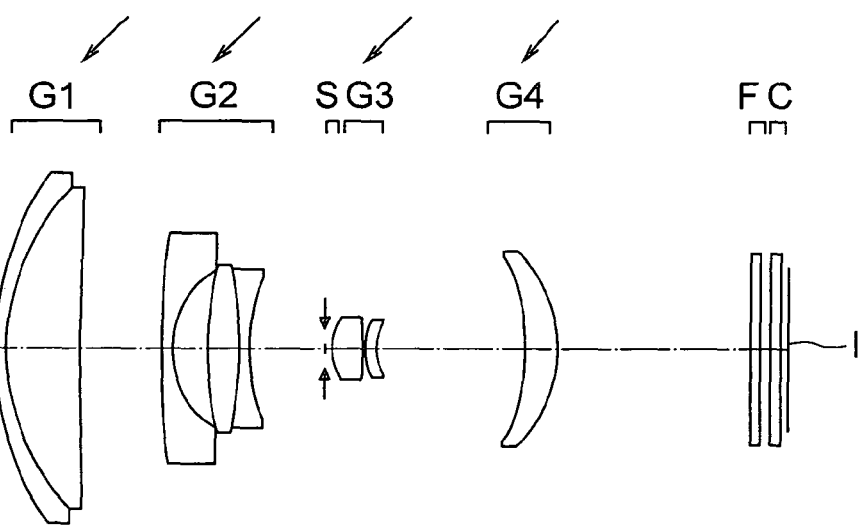
Figure 1C:
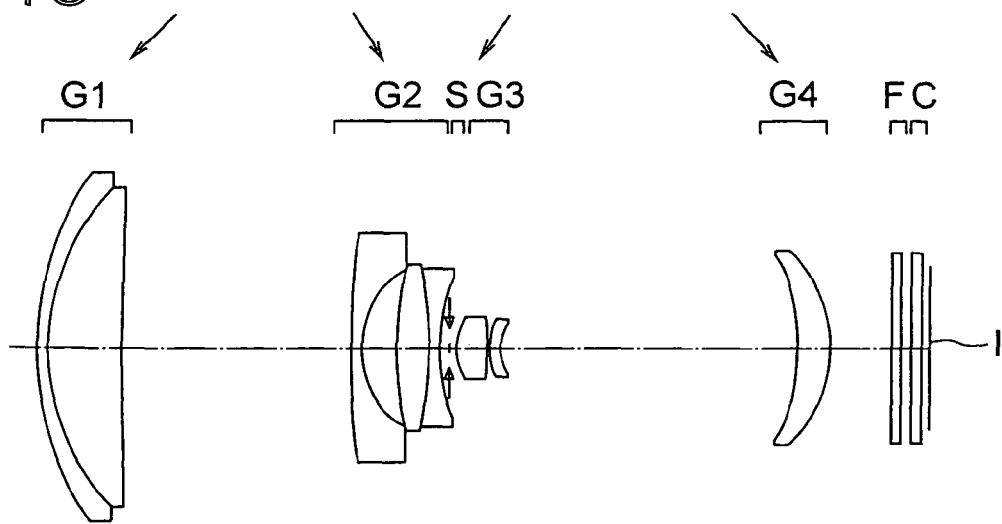

As shown in FIGS. 1A to 1C, the zoom lens according to the first embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side. The second lens unit G2, the third lens unit G3 and the fourth lens unit G4 move along loci that are convex toward the object side. The fourth lens unit G4 is located closer to the image side at the telephoto end than at the wide angle end to increase the magnification.

The first lens unit G1 is composed of a cemented lens composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the positive meniscus lens having a convex surface directed toward the object side in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

Figure 2A:
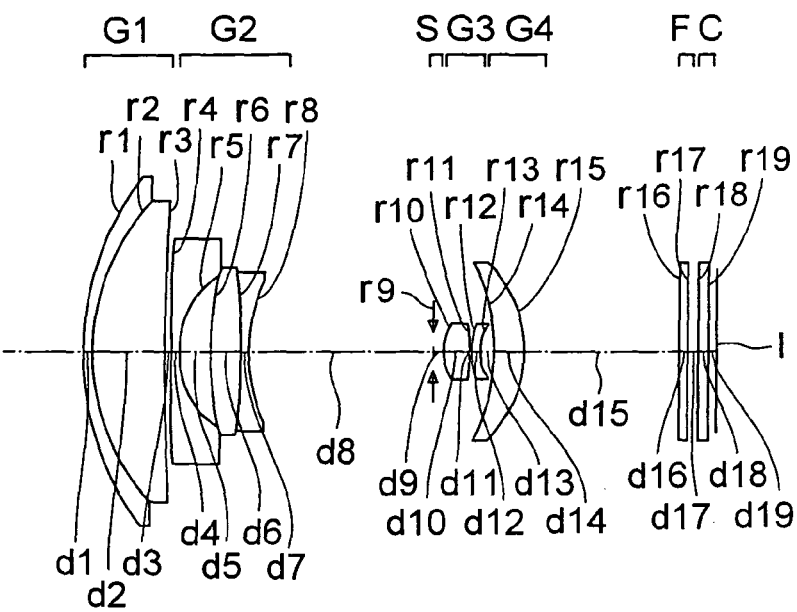
FIGS. 2A, 2B, and 2C are cross sectional views similar to FIGS. 1A to 1C showing a zoom lens according to a second embodiment of the present invention.
Figure 2B:
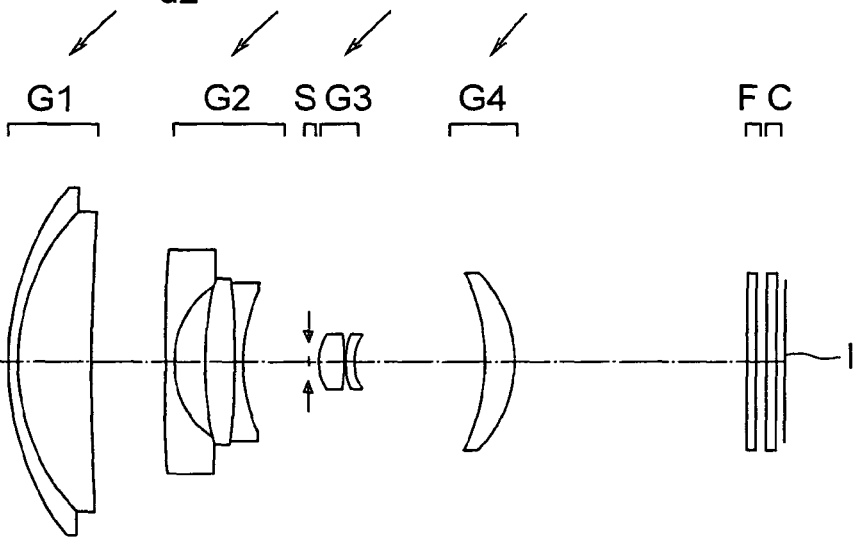
Figure 2C:
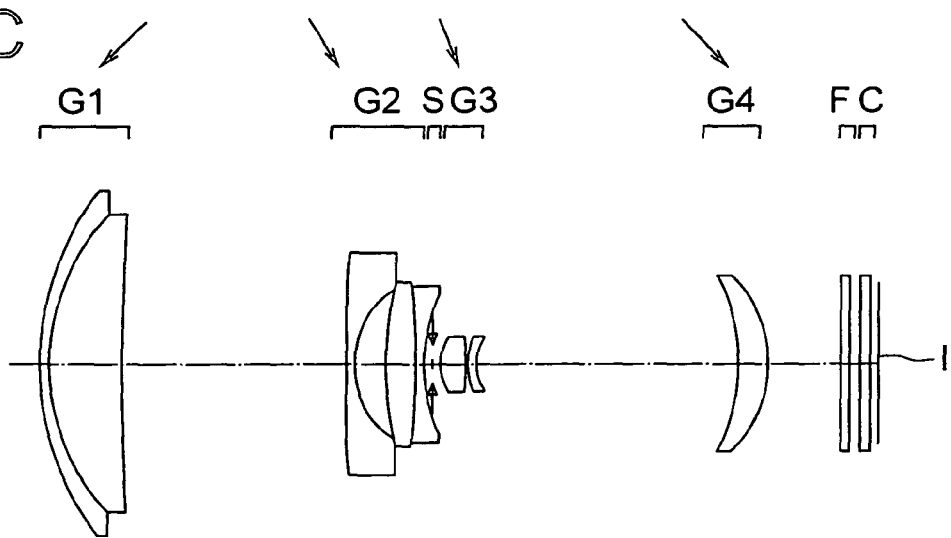

As shown in FIGS. 2A to 2C, the zoom lens according to the second embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side. The second lens unit G2, the third lens unit G3 and the fourth lens unit G4 move along loci that are convex toward the object side. The fourth lens unit G4 is located closer to the image side at the telephoto end than at the wide angle end to increase the magnification.

The first lens unit G1 is composed of a cemented lens composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the positive meniscus lens having a convex surface directed toward the object side in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

Figure 3A:
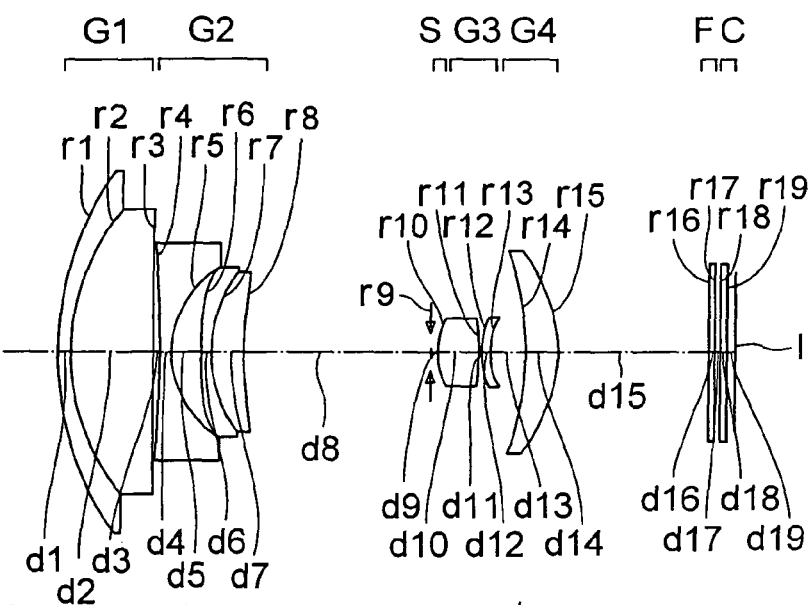
FIGS. 3A, 3B, and 3C are cross sectional views similar to FIGS. 1A to 1C showing a zoom lens according to a third embodiment of the present invention.
Figure 3B:
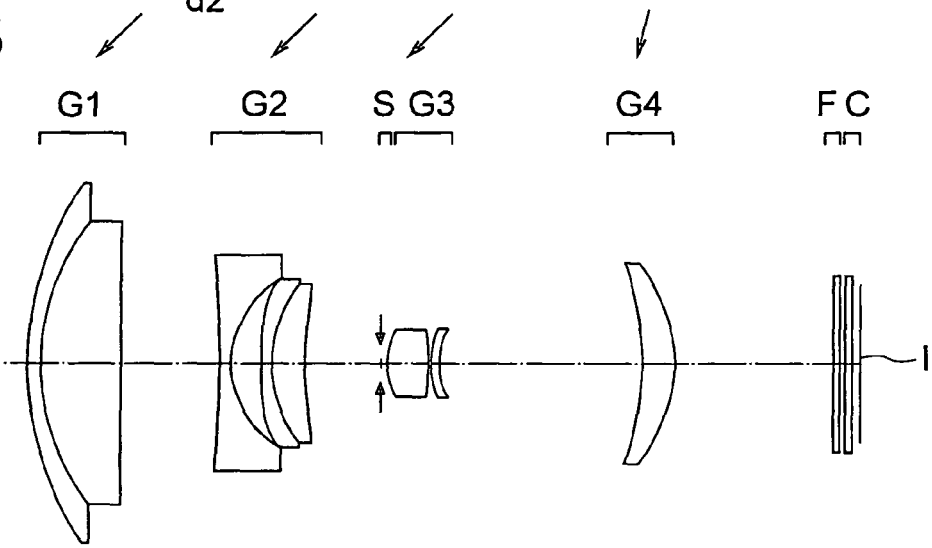
Figure 3C:
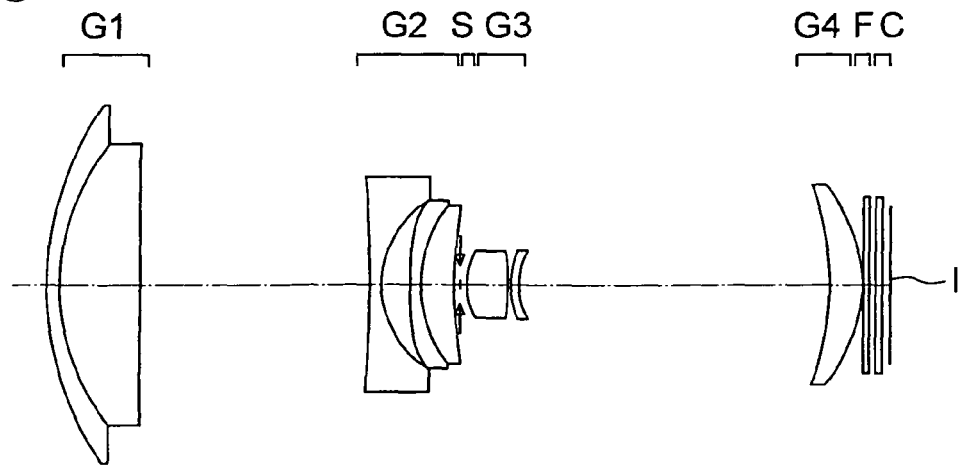

As shown in FIGS. 3A to 3C, the zoom lens according to the third embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side. The second lens unit G2, the third lens unit G3 and the fourth lens unit G4 move along loci that are convex toward the object side. The fourth lens unit G4 is located closer to the image side at the telephoto end than at the wide angle end to increase the magnification.

The first lens unit G1 is composed of a cemented lens composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a negative meniscus lens having a convex surface directed toward the object side and a positive meniscus lens having a convex surface directed toward the object side. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the positive meniscus lens having a convex surface directed toward the object side in the first lens unit G1, both surfaces of the biconcave negative lens in the second lens unit G2, the object side surface of the negative meniscus lens in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

In fourth to sixth embodiments, the zoom lenses according to the first to the third embodiments are respectively used in image pickup apparatuses that have a function of correcting distortion electrically, wherein the shape of the effective image pickup area is changed during zooming. Therefore, in the fourth to the sixth embodiments, the image height and the angle of field at a zoom position are different from those in the respective corresponding embodiments.

In the fourth to the sixth embodiments, barrel distortion that appears at wide angle zoom positions is corrected electrically, and a thus-corrected image is recorded or displayed. Correction of chromatic aberration of magnification can also be corrected electrically by correcting distortion for each of the color signals of R (red), G (green) and B (blue).

In the zoom lenses according to the embodiments, barrel distortion appears on the rectangular photoelectric conversion surface, at the wide angle end. Whereas, at the telephoto end and at zoom positions near the intermediate focal length state, distortion is suppressed.

To correct distortion electrically, the effective image pickup area is designed to have a barrel shape at the wide angle end and a rectangular shape in the intermediate focal length state and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ in the intermediate focal length state and the maximum image height $IH_t$ at the telephoto end.

In the fourth to the sixth embodiments, the effective image pickup area is designed in such a way that the effective image pickup area at the wide angle end has a dimension in the shorter side direction equal to the dimension in the shorter side direction of the photoelectric conversion surface, and a distortion of approximately −2% remains after image processing. As a matter of course, a barrel shaped area smaller than that described above may be set as the effective image pickup area, and image resulting from transformation of this area into a rectangular area may be recorded/reproduced.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for ad-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Example 1

Unit mm

Surface data

| Surface no. | r | d | nd | vd |
|---|---|---|---|---|
| 1 | 15.349 | 0.50 | 1.94595 | 17.98 |
| 2 | 11.357 | 3.50 | 1.77250 | 49.60 |
| 3* | 363.846 | Variable | | |
| 4* | −8871.915 | 0.50 | 1.83481 | 42.71 |
| 5* | 5.391 | 1.65 | | |
| 6 | 16.952 | 1.50 | 1.94595 | 17.98 |
| 7 | −20.046 | 0.50 | 1.77250 | 49.60 |
| 8* | 7.090 | Variable | | |
| 9 (S) | ∞ | 0.30 | | |
| 10* | 2.885 | 1.50 | 1.49700 | 81.54 |
| 11* | −16.218 | 0.10 | | |
| 12 | 3.814 | 0.50 | 2.00170 | 20.64 |
| 13* | 2.544 | Variable | | |
| 14 | −9.459 | 1.50 | 1.74320 | 49.34 |
| 15* | −6.453 | Variable | | |
| 16 | ∞ | 0.40 | 1.54771 | 62.84 |
| 17 | ∞ | 0.50 | | |
| 18 | ∞ | 0.50 | 1.51633 | 64.14 |
| 19 | ∞ | 0.37 | | |

-continued

| Unit mm | | | | |
|---|---|---|---|---|
| Image plane (Light receiving surface) | ∞ | | | |

Aspherical surface data

3rd surface k = 0.000, A4 = 1.59428e−05, A6 = 9.09943e−08

4th surface k = 0.000, A4 = 9.06376e−04, A6 = −3.82527e−05, A8 = 7.08506e−07, A10 = −4.78046e−09

5th surface k = 0.000, A4 = 2.02837e−03, A6 = 8.05374e−05, A8 = −8.42827e−08, A10 = −6.53433e−09

8th surface k = 0.000, A4 = −2.12944e−03, A6 = −1.32698e−05, A8 = 1.19902e−06, A10 = −5.66577e−09

10th surface k = 0.000, A4 = −1.49814e−03, A6 = −1.54456e−04, A8 = −4.31939e−06, A10 = −6.98110e−08

11th surface k = 0.000, A4 = 4.41037e−03, A6 = −2.49679e−07, A8 = 3.44841e−06, A10 = −2.95705e−08

13th surface k = 0.000, A4 = 7.23212e−04, A6 = 3.44135e−04

15th surface k = 0.000, A4 = 3.00000e−05

Focal length of each lens unit

| f1 = 22.35 | f2 = −4.55 | f3 = 7.58 | f4 = 22.41 |
|---|---|---|---|

Zoom data

| | WE | ST | TE |
|---|---|---|---|
| f (mm) | 5.10 | 14.75 | 49.09 |
| Fno. | 5.99 | 9.26 | 11.00 |
| 2ω (°) | 77.20 | 29.61 | 9.57 |
| BF | 8.33 | 10.69 | 4.42 |
| Lens total length | 30.24 | 37.18 | 42.06 |
| d3 | 0.30 | 3.90 | 10.91 |
| d8 | 8.57 | 3.52 | 0.49 |
| d13 | 1.00 | 7.02 | 14.19 |
| d15 | 6.82 | 9.24 | 2.95 |

Example 2

| Unit mm | | | | |
|---|---|---|---|---|
| Surface data | | | | |
| Surface no. | r | d | nd | vd |
| 1 | 14.588 | 0.40 | 1.94595 | 17.98 |
| 2 | 11.065 | 3.50 | 1.77250 | 49.60 |
| 3* | 217.453 | Variable | | |
| 4* | −64.965 | 0.40 | 1.83481 | 42.71 |
| 5* | 6.264 | 1.52 | | |
| 6 | 16.179 | 1.40 | 2.11764 | 16.79 |
| 7 | −32.931 | 0.40 | 1.83481 | 42.71 |
| 8* | 6.538 | Variable | | |
| 9 (S) | ∞ | 0.30 | | |

-continued

| Unit mm | | | | |
|---|---|---|---|---|
| 10* | 2.820 | 1.20 | 1.49700 | 81.54 |
| 11* | −28.531 | 0.10 | | |
| 12 | 3.539 | 0.40 | 2.00170 | 20.64 |
| 13* | 2.472 | Variable | | |
| 14 | −9.573 | 1.40 | 1.77250 | 49.60 |
| 15* | −6.332 | Variable | | |
| 16 | ∞ | 0.40 | 1.54771 | 62.84 |
| 17 | ∞ | 0.50 | | |
| 18 | ∞ | 0.50 | 1.51633 | 64.14 |
| 19 | ∞ | 0.37 | | |
| Image plane (Light receiving surface) | ∞ | | | |

Aspherical surface data

3rd surface k = 0.000, A4 = 2.06323e−05, A6 = 6.50107e−08

4th surface k = 0.000, A4 = 1.10959e−03, A6 = −3.98151e−05, A8 = 7.08345e−07, A10 = −4.95015e−09

5th surface k = 0.000, A4 = 2.10330e−03, A6 = 8.27618e−05, A8 = −1.28187e−07, A10 = −4.93739e−09

8th surface k = 0.000, A4 = −1.87704e−03, A6 = −1.17134e−05, A8 = 1.17530e−06, A10 = −5.48632e−09

10th surface k = 0.000, A4 = −8.00000e−04, A6 = −1.41957e−04, A8 = −4.29901e−06, A10 = −6.98073e−08

11th surface k = 0.000, A4 = 4.49180e−03, A6 = 6.86008e−07, A8 = 3.45136e−06, A10 = −2.94729e−08

13th surface k = 0.000, A4 = 7.51152e−04, A6 = 3.77400e−04

15th surface k = 0.000, A4 = 3.00000e−05

Focal length of each lens unit

| f1 = 21.61 | f2 = −4.67 | f3 = 8.12 | f4 = 20.27 |
|---|---|---|---|

Zoom data

| | WE | ST | TE |
|---|---|---|---|
| f (mm) | 5.10 | 15.14 | 47.14 |
| Fno. | 6.65 | 10.29 | 11.00 |
| 2ω (°) | 78.93 | 28.53 | 9.77 |
| BF | 8.89 | 12.55 | 4.99 |
| Lens total length | 29.96 | 36.75 | 39.74 |
| d3 | 0.30 | 3.51 | 10.75 |
| d8 | 9.05 | 3.35 | 0.40 |
| d13 | 0.70 | 6.32 | 12.59 |
| d15 | 7.40 | 11.10 | 3.57 |

Example 3

| Unit mm | | | | |
|---|---|---|---|---|
| Surface data | | | | |
| Surface no. | r | d | nd | vd |
| 1 | 16.468 | 0.60 | 1.94595 | 17.98 |
| 2 | 11.669 | 4.00 | 1.77250 | 49.60 |
| 3* | −298.514 | Variable | | |
| 4* | −35.694 | 0.50 | 1.83481 | 42.71 |
| 5* | 5.250 | 1.50 | | |
| 6* | 41.185 | 0.50 | 1.77250 | 49.60 |
| 7 | 6.700 | 1.60 | 1.94595 | 17.98 |
| 8 | 21.527 | Variable | | |
| 9 (S) | ∞ | 0.30 | | |
| 10* | 4.099 | 2.05 | 1.49700 | 81.54 |
| 11* | −10.634 | 0.10 | | |
| 12 | 4.996 | 0.40 | 2.00170 | 20.64 |
| 13 | 3.471 | Variable | | |
| 14* | −10.082 | 1.60 | 1.74320 | 49.34 |
| 15* | −5.932 | Variable | | |
| 16 | ∞ | 0.30 | 1.54771 | 62.84 |
| 17 | ∞ | 0.30 | | |
| 18 | ∞ | 0.30 | 1.51633 | 64.14 |
| 19 | ∞ | 0.37 | | |
| Image plane (Light receiving surface) | ∞ | | | |

Aspherical surface data

3rd surface $k = 0.000, A4 = 2.79166e{-}05, A6 = -9.61223e{-}08$

4th surface $k = 0.000, A4 = 6.02597e{-}04, A6 = -3.67937e{-}05, A8 = 9.10591e{-}07, A10 = -7.79624e{-}09$ 5th surface $k = 0.000, A4 = 6.24667e{-}04, A6 = 6.02647e{-}05, A8 = -2.20783e{-}06, A10 = -1.71665e{-}08$ 6th surface $k = 0.000, A4 = 9.33860e{-}04, A6 = 3.93633e{-}05$ 10th surface $k = 0.000, A4 = -2.44420e{-}03, A6 = -1.76979e{-}05, A8 = -3.79600e{-}06, A10 = -7.36605e{-}08$ 11th surface $k = 0.000, A4 = 1.98650e{-}04, A6 = -4.57669e{-}05, A8 = 2.54073e{-}06, A10 = -2.62988e{-}08$ 14th surface $k = 0.000, A4 = 1.16049e{-}03, A6 = -2.06578e{-}05$ 15th surface $k = 0.000, A4 = 1.54681e{-}03, A6 = -7.33550e{-}07$

| Focal length of each lens unit | | | |
|---|---|---|---|
| f1 = 22.14 | f2 = −5.32 | f3 = 9.37 | f4 = 16.56 |

| Zoom data | | | |
|---|---|---|---|
| | WE | ST | TE |
| f (mm) | 5.10 | 14.24 | 48.56 |
| Fno. | 6.01 | 8.67 | 11.00 |
| 2ω (°) | 77.92 | 27.89 | 9.39 |
| BF | 8.49 | 8.93 | 1.13 |
| Lens total length | 32.91 | 40.53 | 41.14 |
| d3 | 0.30 | 4.73 | 11.21 |
| d8 | 9.19 | 3.81 | 0.30 |
| d13 | 1.77 | 9.91 | 15.36 |
| d15 | 7.40 | 7.89 | 0.13 |

The zoom lens used in the fourth embodiment is the same as the zoom lens according to the first embodiment.

The zoom lens used in the fifth embodiment is the same as the zoom lens according to the second embodiment.

The zoom lens used in the sixth embodiment is the same as the zoom lens according to the third embodiment.

Data of image height and total image angle in example 4 are as shown below.

| Zoom data | | | |
|---|---|---|---|
| | WE | ST | TE |
| f (mm) | 5.10 | 14.75 | 49.09 |
| Fno. | 5.99 | 9.26 | 11.00 |
| 2ω (°) | 77.20 | 29.61 | 9.57 |
| IH | 3.862 | 3.88 | 3.88 |

Data of image height and total image angle in example 5 are as shown below.

| Zoom data | | | |
|---|---|---|---|
| | WE | ST | TE |
| f (mm) | 5.10 | 15.14 | 47.14 |
| Fno. | 6.65 | 10.29 | 11.00 |
| 2ω (°) | 78.93 | 28.53 | 9.77 |
| IH | 77.3 | 3.80 | 3.80 |

Data of image height and total image angle in example 6 are as shown below.

| Zoom data | | | |
|---|---|---|---|
| | WE | ST | TE |
| f (mm) | 5.10 | 14.24 | 48.56 |
| Fno. | 6.01 | 8.67 | 11.00 |
| 2ω (°) | 77.92 | 27.89 | 9.39 |
| IH | 3.768 | 3.88 | 3.88 |

Figure 7A:
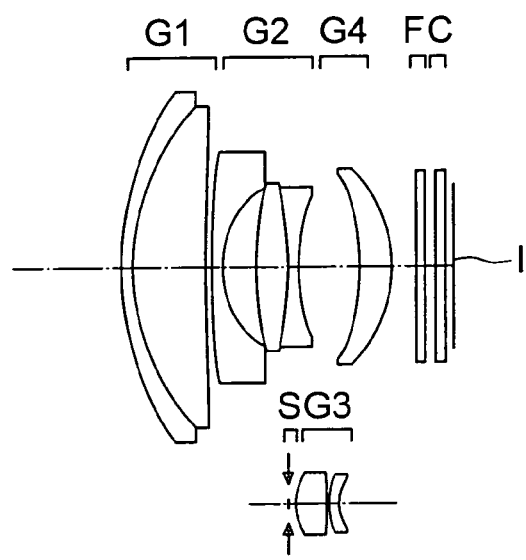
FIGS. 7A, 7B and 7C are cross sectional views of the zoom lenses according to the first, the second and the third embodiment respectively in the state in which lens barrel is collapsed.
Figure 7B:
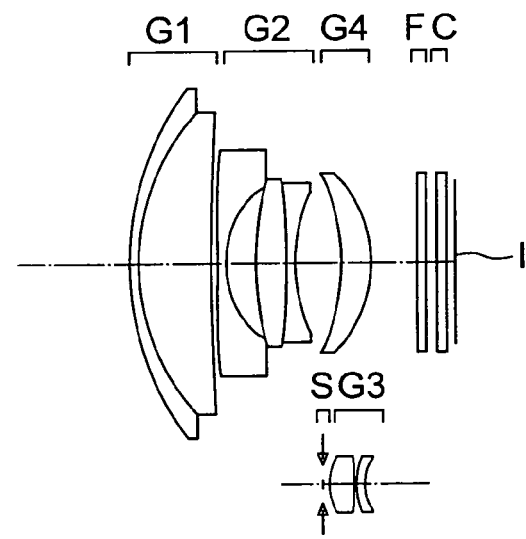
Figure 7C:
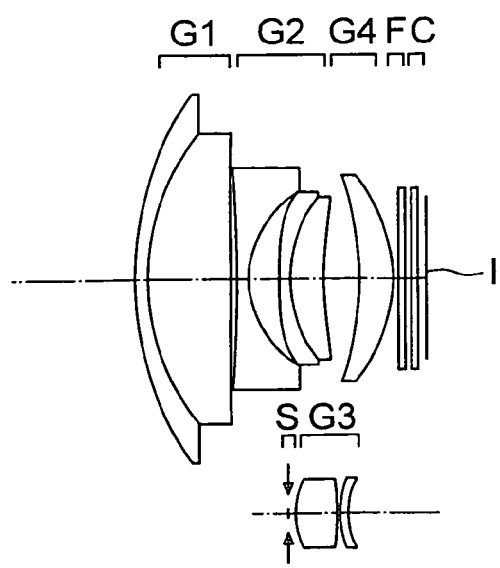

FIGS. 7A, 7B and 7C are cross sectional views of the zoom lenses according to the first, the second and the third embodiments respectively in the state in which the lens barrel is collapsed. When the zoom lenses of the embodiments are collapsed, the first lens unit G1, the second lens unit G2 and the fourth lens unit G4 move along the optical axis of the lens units toward the image side, whereby the lens barrel is collapsed. On the other hand, the third lens unit G3 moves away from the optical axis to a position behind the first lens unit G1 to stay side by side with the second lens unit G2 and the fourth lens unit G4.

Figure 5A:
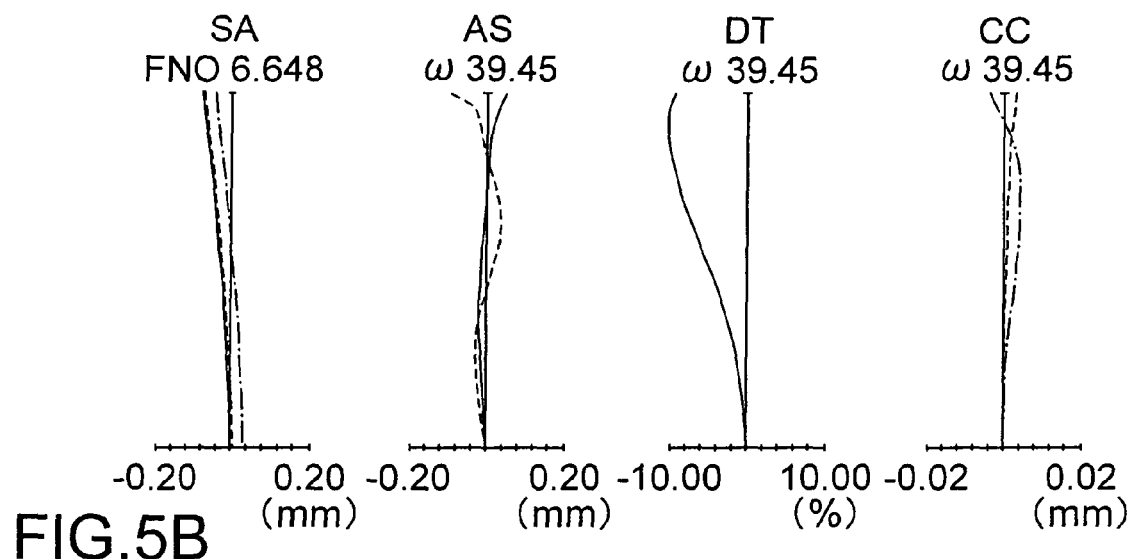
FIGS. 5A, 5B and 5C are aberration diagrams of the zoom lens according to the second embodiment in the state in which the zoom lens is focused on an object point at infinity.
Figure 5B:
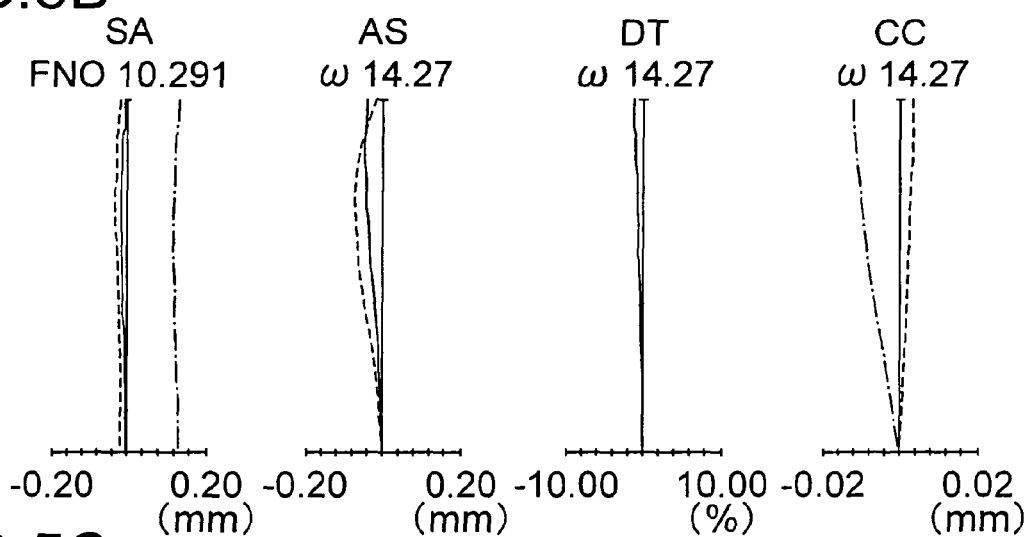
Figure 5C:
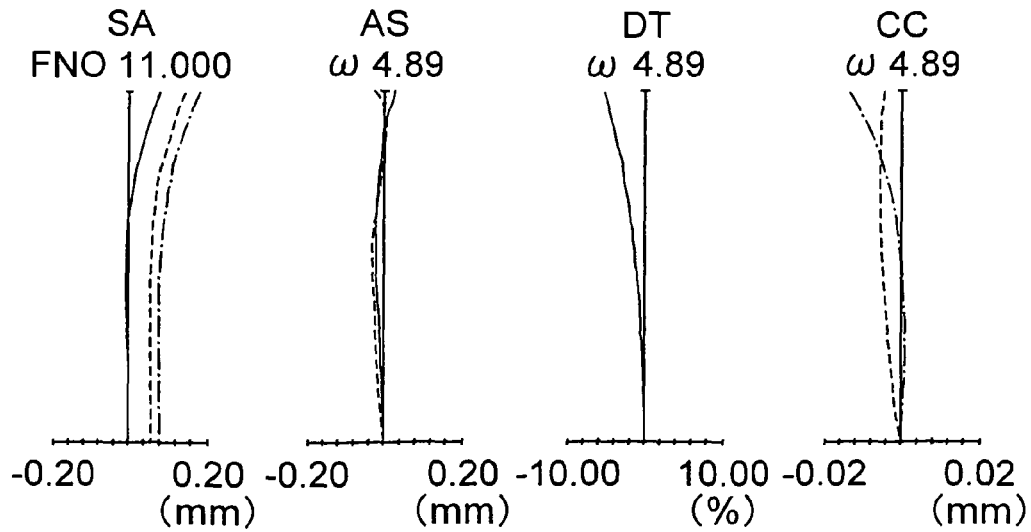
Figure 6A:
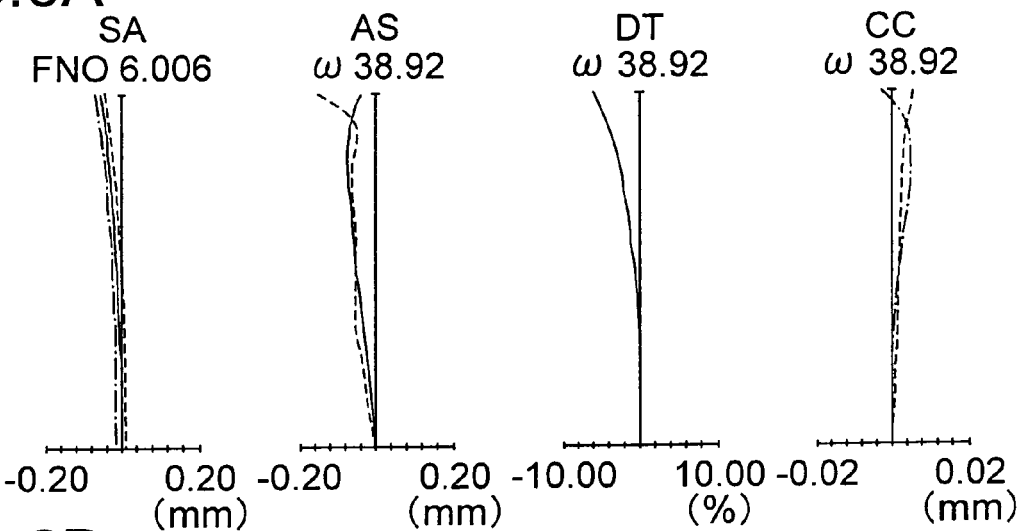
FIGS. 6A, 6B and 6C are aberration diagrams of the zoom lens according to the third embodiment in the state in which the zoom lens is focused on an object point at infinity.
Figure 6B:
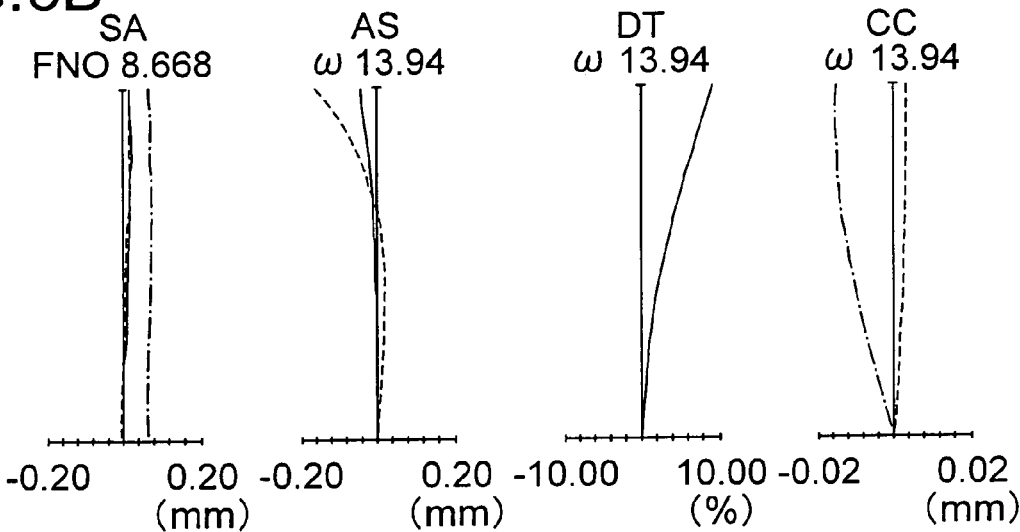
Figure 6C:
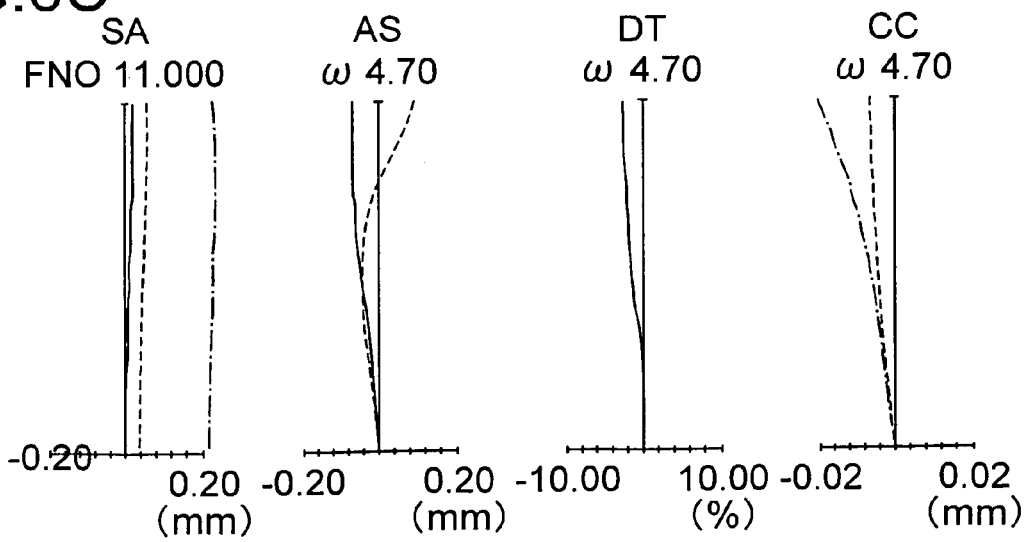

FIGS. 4A to 4C, 5A to 5C and 6A to 6C are aberration diagrams of the zoom lenses according to the first to the third embodiments in the state in which the zoom lenses are focused on an object point at infinity. These aberration diagrams show spherical aberration (SA), astigmatism (AS), distortion (DT) and chromatic aberration of magnification (CC) at the wide angle end (FIGS. 4A, 5A and 6A), in the intermediate focal length state (FIGS. 4B, 5B and 6B) and at the telephoto end (FIGS. 4C, 5C and 6C). In these diagrams, the sign "ω" represents half the angle of field.

Values of conditional expressions of each of embodiments are as shown below.

|  | Example 1 | Example 2 | Example 3 |
| --- | --- | --- | --- |
| IH | 3.88 | 3.8 | 3.88 |
| Zooming ratio (3) $f_t/f_w$ | 9.62 | 9.24 | 9.51 |
| outer diameter of third lens unit φ3 | 2.38 | 2.17 | 2.48 |
| effective diameter of third lens unit | 1.98 | 1.77 | 2.08 |
| outer diameter of forth lens unit φ4 | 8.69 | 8.01 | 9.40 |
| effective diameter of forth lens unit | 8.29 | 7.61 | 9.00 |
| outer diameter of third lens unit/ outer diameter of third lens unit (2) φ3/φ4 | 0.27 | 0.27 | 0.26 |
| effective diameter of third lens unit/ effective diameter of forth lens unit | 0.24 | 0.23 | 0.23 |
| (1) $G_1/\Delta G_3$ | 1.27 | 1.23 | 1.32 |
| (4) $\nu_{31}$ | 81.54 | 81.54 | 81.54 |
| (5) $TL_t/f_t$ | 0.86 | 0.85 | 0.85 |
| (6) $D_{3G}/TL_t$ | 0.050 | 0.042 | 0.062 |
| (7) $f_{3G}/f_t$ | 0.15 | 0.17 | 0.19 |
| effective diameter of first surface | 15.80 | 16.00 | 17.00 |
| effective diameter of second surface | 14.41 | 13.66 | 13.15 |
| effective diameter of third surface | 13.00 | 12.80 | 12.29 |
| effective diameter of forth surface | 10.13 | 10.04 | 9.83 |
| effective diameter of fifth surface | 7.20 | 7.26 | 7.43 |
| effective diameter of sixth surface | 7.07 | 7.14 | 7.42 |
| effective diameter of seventh surface | 6.69 | 6.73 | 7.01 |
| effective diameter of eighth surface | 6.00 | 6.00 | 6.60 |
| effective diameter of ninth surface | 1.90 | 1.68 | 1.85 |
| effective diameter of tenth surface | 1.98 | 1.77 | 2.08 |
| effective diameter of eleventh surface | 1.82 | 1.74 | 2.42 |
| effective diameter of twelfth surface | 1.77 | 1.72 | 2.48 |
| effective diameter of thirteenth surface | 1.60 | 1.60 | 2.40 |
| effective diameter of fourteenth surface | 8.00 | 7.60 | 9.00 |
| effective diameter of fifteenth surface | 8.29 | 7.61 | 7.84 |
| effective diameter of sixteenth surface | 8.17 | 7.58 | 7.81 |
| effective diameter of seventeenth surface | 8.16 | 7.58 | 7.80 |
| effective diameter of eighteenth surface | 8.15 | 7.58 | 7.80 |
| effective diameter of nineteenth surface | 8.14 | 7.57 | 7.79 |

(Correction of Distortion)

Incidentally, when the zoom lens system of the present invention is used, a digital correction of distortion of an image is carried out electrically. A basic concept for the digital correction of the distortion of an image will be described below.

Figure 8:
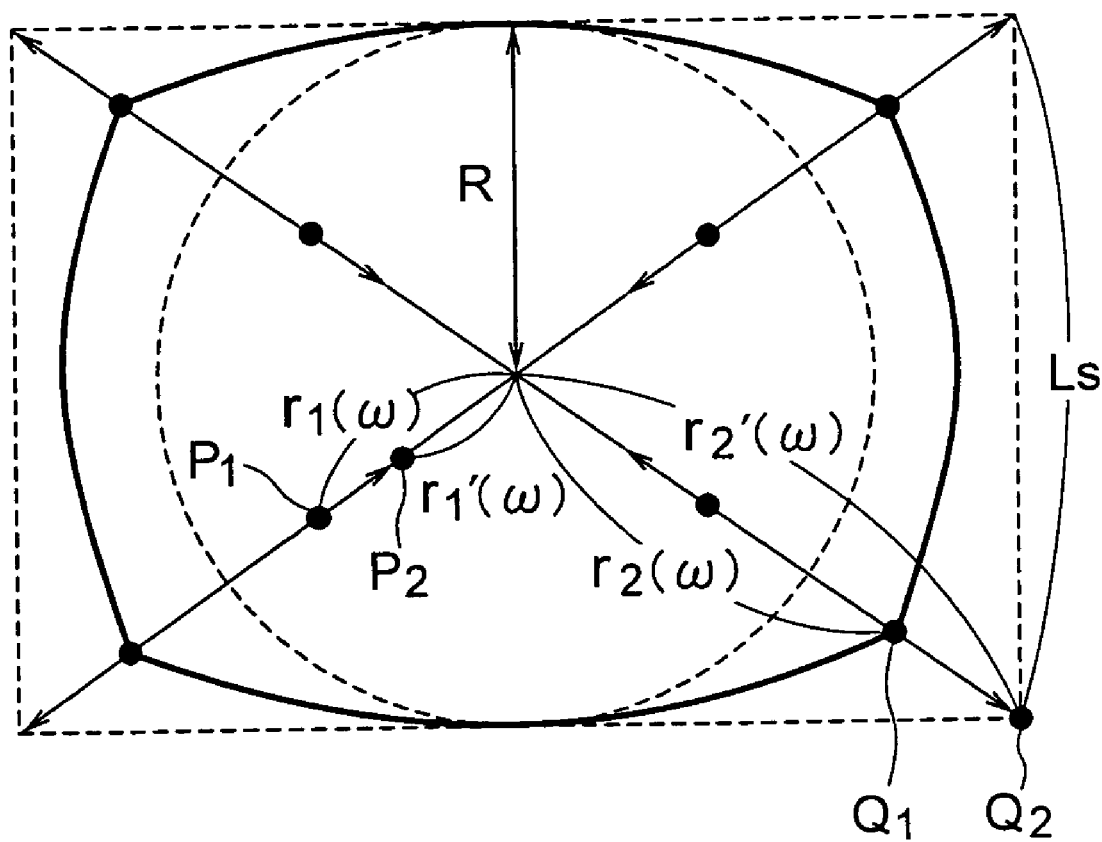
FIG. 8 is a diagram illustrating correction of distortion.

For example, as shown in FIG. 8, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 8, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω)=α·f·\tan ω (0≦α≦1)$$

where, ω is a half image angle of an object and f is a focal length of an imaging optical system (the zoom lens system in the present invention).

Here, when an ideal image height corresponding to a circle (image height) of radius R is let to be Y, then $$α=R/Y=R/(f·\tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0≦R≦0.6Ls$$

where, Ls is a length of a short side of the effective image pickup surface.

It is preferable that the radius R satisfies the following conditional expression.

$$0.3Ls≦R≦0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $r'(\omega) = \alpha \cdot f \tan \omega$ near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $r'(\omega) = \alpha \cdot f \tan \omega$ near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f = y/\tan \omega$ holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 9:
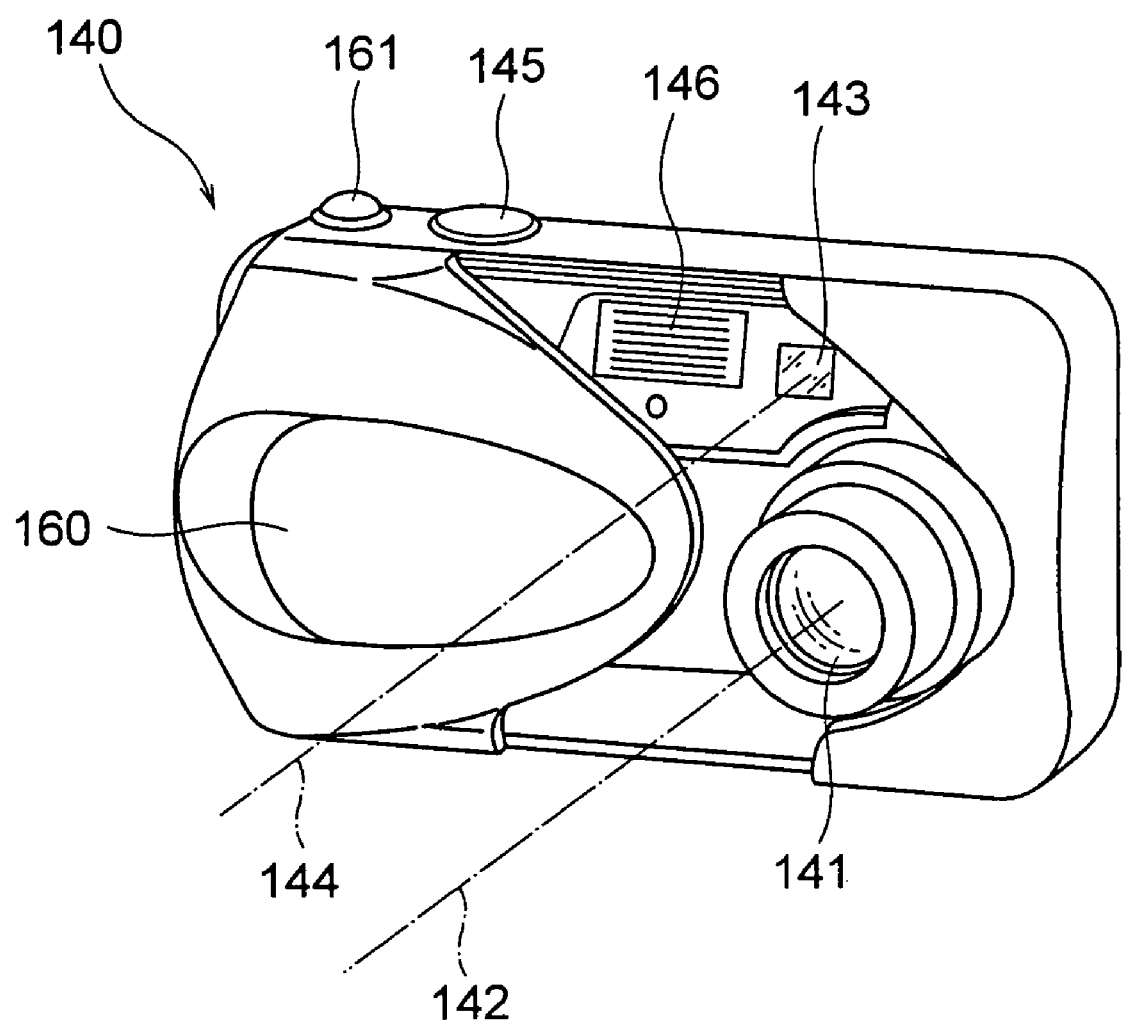
FIG. 9 is a front perspective view showing an outer appearance of a digital camera equipped with a zoom lens according to the present invention.
Figure 10:
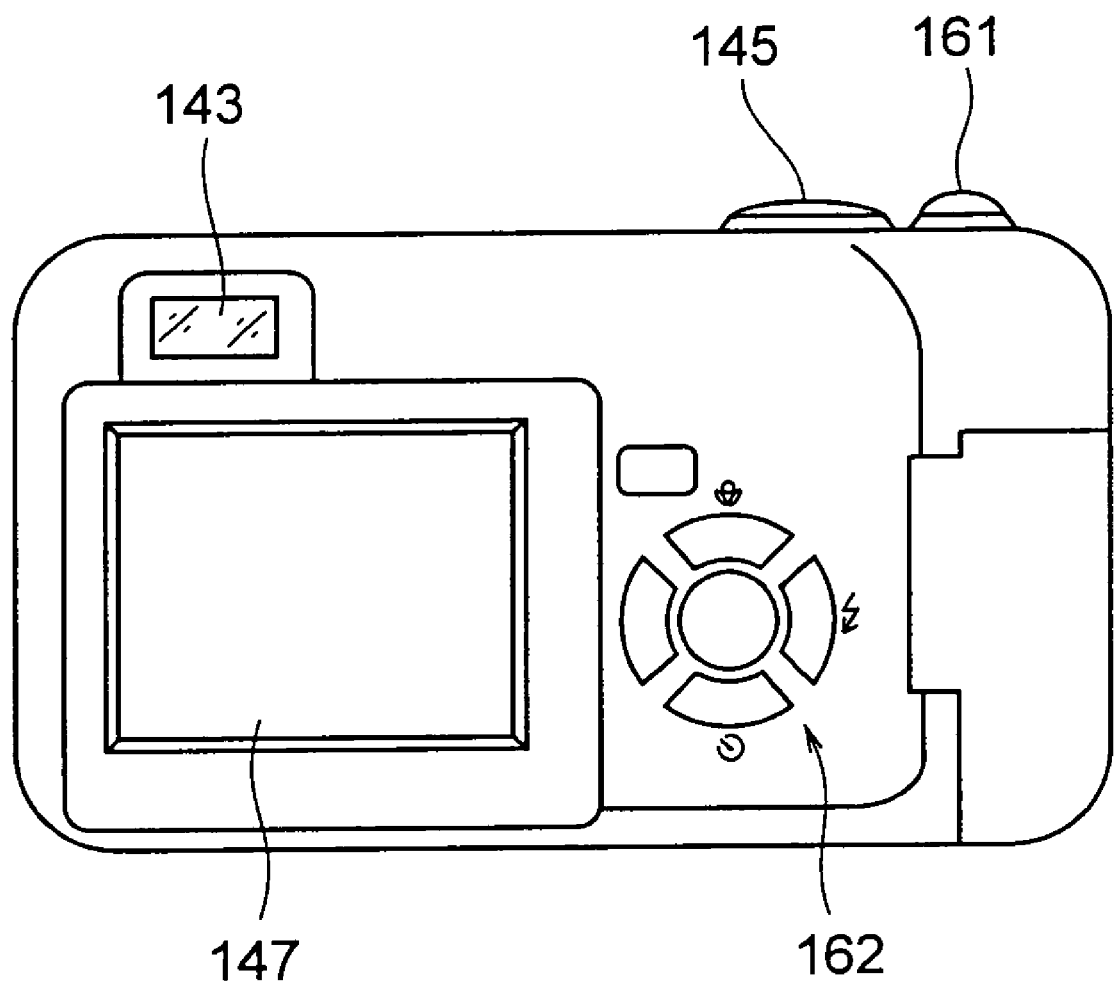
FIG. 10 is a rear perspective view of the digital camera.
Figure 11:
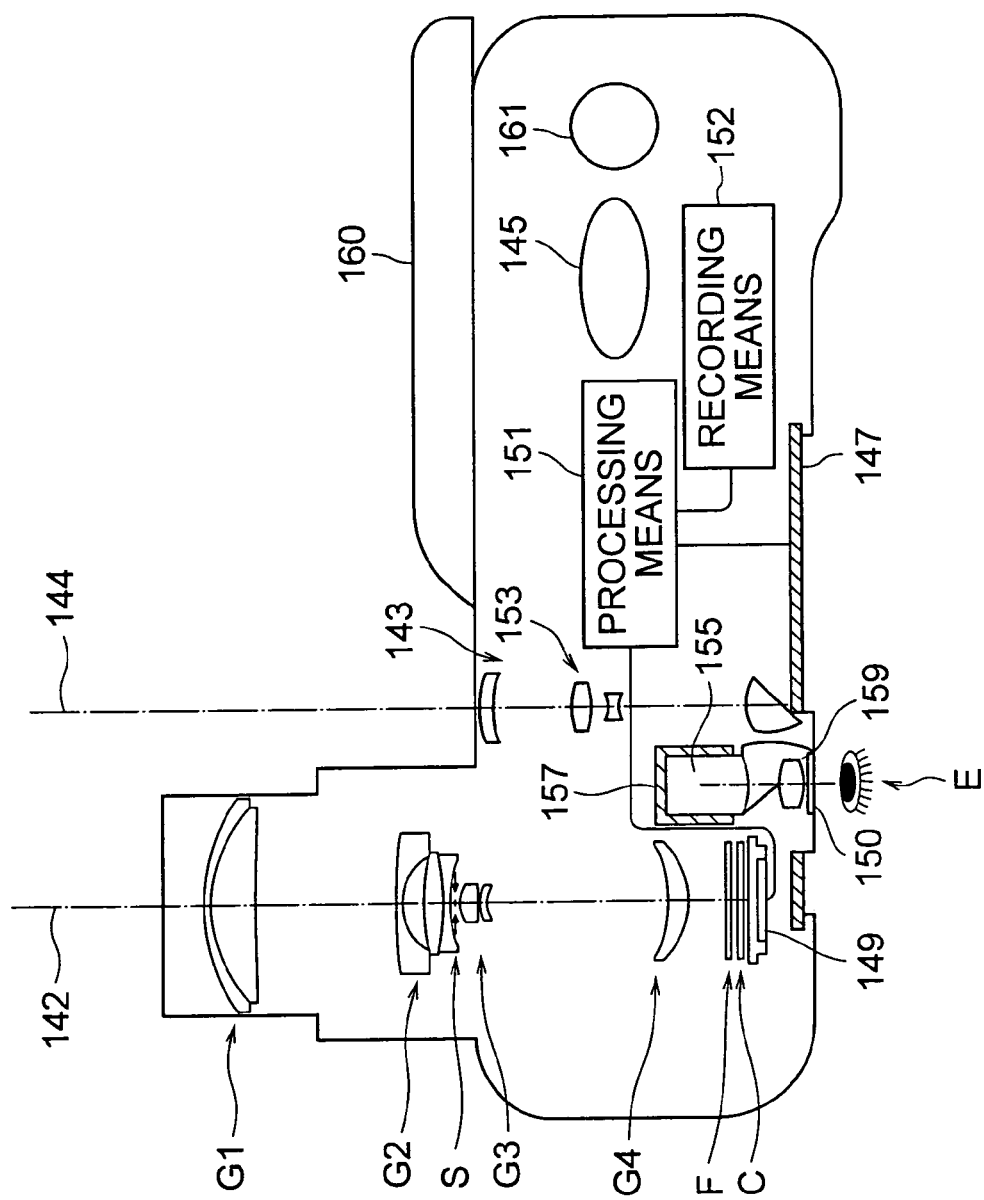
FIG. 11 is a cross sectional view of the digital camera.

FIG. 9 to FIG. 11 are conceptual diagrams of a structure of a digital camera according to the present invention in which a zoom lens system described above is incorporated in a taking optical system 141. FIG. 9 is a front perspective view showing an appearance of a digital camera 140, FIG. 10 is a rear perspective view of the same, and FIG. 11 is a schematic cross-sectional view showing a structure of the digital camera 140. In FIG. 9 and FIG. 11, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 11, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 12 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 12, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

INDUSTRIAL APPLICABILITY

As described above, the zoom lens according to the present invention is useful in providing a zoom lens having a high zoom ratio that is advantageous in reducing the size in the state in which the lens barrel is collapsed.

According to the present invention, there can be provided a zoom lens having a high zoom ratio that is advantageous in reducing the size in the state in which the lens barrel is collapsed and an image pickup apparatus equipped with such a zoom lens.

What is claimed is:

1. A zoom lens comprising, in order from an object side thereof:

a first lens unit having a positive refracting power;
a second lens unit having a negative refracting power;
a third lens unit having a positive refracting power; and
a fourth lens unit having a refracting power, wherein
the zoom lens further comprises an aperture stop disposed closer to the image side than the second lens unit and closer to the object side than a lens surface closest to the image side in the third lens unit,
during zooming from a wide angle end to a telephoto end in a state in which the zoom lens is focused at the farthest distance, a distance between the first lens unit and the second lens unit is larger at the telephoto end than at the wide angle end, a distance between the second lens unit and the third lens unit is smaller at the telephoto end than at the wide angle end, a distance between the third lens unit and the fourth lens unit changes, the first lens unit, the third lens unit and the aperture stop move in such a way that they are located closer to the object side at the telephoto end than at the wide angle end,
when a lens component is defined as a lens member whose surfaces that are in contact with air on an optical axis include only two surfaces, one being an incidence side surface and the other being an exit side surface, the first lens unit comprises one lens component, and the total number of lens components included in the first lens unit is one,
the third lens unit comprises a positive lens and a negative lens, and
the zoom lens satisfies the following conditions:

$$0.8 < \Delta G_1 / \Delta G_3 < 1.6$$

$$0.15 < \phi 3 / \phi < 0.35$$

$$8.0 < f_t / f_w < 25.0$$

where, $\Delta G_1$ is an amount of displacement, on the optical axis, of the position of the first lens unit at the telephoto end with respect to the position thereof at the wide angle end, wherein displacements toward the object side at the telephoto end are represented by positive values, $\Delta G_3$ is an amount of displacement, on the optical axis, of the position of the third lens unit at the telephoto end with respect to the position thereof at the wide angle end, wherein displacements toward the object side at the telephoto end are represented by positive values, $\phi 3$ is a lens size in the third lens unit represented by the maximum value of a length from one edge to another of the lens measured along a straight line containing a point through which the optical axis passes and perpendicular to the optical axis, φ4 is a lens size in the fourth lens unit represented by the maximum value of a length from one edge to another of the lens measured along a straight line containing a point through which the optical axis passes and perpendicular to the optical axis, $f_w$ is a focal length of the entire zoom lens system at the wide angle end, and $f_t$ is a focal length of the entire zoom lens system at the telephoto end.

2. The zoom lens according to claim 1, wherein the lens component in the first lens unit is a cemented lens comprising a biconvex positive lens and a negative lens.

3. The zoom lens according to claim 1, wherein the lens component in the first lens unit is a positive lens component having a biconvex shape.

4. A zoom lens according to claim 1, wherein the second lens unit comprises a plurality of negative lenses and at least one positive lens.

5. The zoom lens according to claim 1, wherein
the second lens unit comprises, in order from the object side, an object side lens component having a negative refracting power and having a concave surface directed toward the image side and an image side lens component having a concave surface directed toward the image side,
the total number of lens components included in the second lens unit is two, and
the image side lens component in the second lens unit comprises a positive lens and a negative lens.

6. The zoom lens according to claim 1, wherein
the third lens unit comprises, in order from the object side, a positive lens component having a positive refracting power and a negative lens component having a negative refracting power, and
the total number of lens components included in the third lens unit is two.

7. The zoom lens according to claim 1, wherein
the third lens unit comprises, in order from the object side, a biconvex positive lens component having a convex surface directed toward the object side and a meniscus negative lens component having a convex surface directed toward the object side, and
the total number of lens components included in the third lens unit is two.

8. The zoom lens according to claim 1, wherein a lens located closest to the object side in the third lens unit is a biconvex positive lens having an object side surface that has a paraxial curvature lager than a paraxial curvature of its image side surface and satisfies the following condition:

$$75 < \nu_{31} < 96$$

where $\nu_{31}$ is the Abbe number of the biconvex positive lens located closest to the object side in the third lens unit.

9. The zoom lens according to claim 1, wherein
the fourth lens unit comprises one lens having an aspheric surface,
the total number of lenses included in the fourth lens unit is one, and
the lens in the fourth lens unit has a convex image side surface that has a paraxial curvature that is larger in absolute value than a paraxial curvature of its object side surface.

10. The zoom lens according to claim 9, wherein the lens in the fourth lens unit is a meniscus lens having a positive refracting power.

11. The zoom lens according to claim 1, wherein the zoom lens satisfies the following condition:

$$0.6 < TL_t/f_t < 0.9$$

where $TL_t$ is an actual distance on the optical axis from an object side surface of the first lens unit to an image plane at the telephoto end, and $f_t$ is the focal length of the entire zoom lens system at the telephoto end.

12. The zoom lens according to claim 1, wherein during zooming from the wide angle end to the telephoto end, the aperture stop moves integrally with the third lens unit.

13. The zoom lens according to claim 1, wherein the zoom lens satisfies the following condition:

$$0.03 \leq D_{3G}/TL_t < 0.07$$

where $D_{3G}$ is a thickness of the third lens unit on the optical axis, and $TL_t$ is an actual distance on the optical axis from an object side surface of the first lens unit to an image plane at the telephoto end.

14. The zoom lens according to claim 1, wherein the zoom lens satisfies the following condition:

$$0.13 < f_{3G}/f_t < 0.22$$

where $f_{3G}$ is a focal length of the third lens unit, and $f_t$ is the focal length of the entire zoom lens system at the telephoto end.

15. An image pickup apparatus comprising:
a zoom lens according to claim 1; and
an image pickup element disposed on the image side of the zoom lens that converts an image formed by the zoom lens into an electrical signal.

16. The image pickup apparatus according to claim 15, further comprising an image processing section that performs signal processing that corrects aberration contained in an image represented by the electrical signal.

17. The image pickup apparatus according to claim 16, wherein the third lens unit is retracted to a position at which the optical axis of the third lens unit is spaced apart from the optical axis of the first, the second and the fourth lens units.

18. The image pickup apparatus according to claim 15, wherein the third lens unit is retracted to a position at which the optical axis of the third lens unit is spaced apart from the optical axis of the first, the second and the fourth lens units.

* * * * *